Patented Aug. 11, 1936

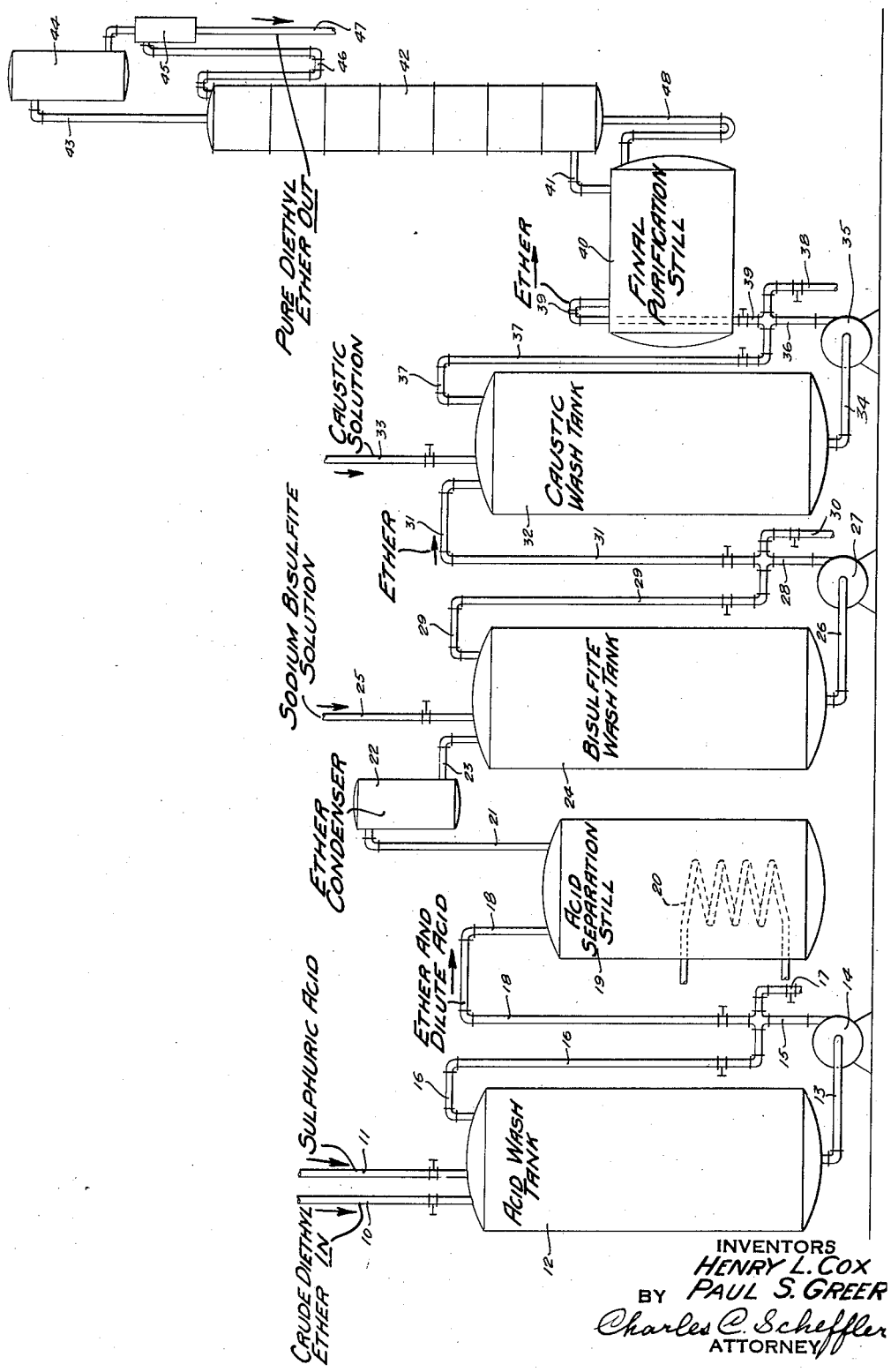

2,050,600

UNITED STATES PATENT OFFICE 2,050,600

PRODUCTION AND PURIFICATION OF DIETHYL ETHER

Henry L. Cox, South Charleston, and Paul S. Greer, Charleston, W. Va., assignors, by mesne assignments, to Union Carbide and Carbon Corporation, a corporation of New York Application May 31, 1933, Serial No. 673,630

24 Claims. (Cl. 260—151)

The invention is a process for making diethyl ether, and specifically relates to a process for making diethyl ether of great purity from the products of the hydrolysis of ethyl sulfates.

Diethyl ether is one of the products resulting from the hydrolysis of ethyl sulfate liquors which are obtained by absorbing ethylene in sulfuric acid. When prepared by this method the crude ether is usually contaminated with aldehydes, ketones, acetals, peroxides, water and various other materials in small amounts. The removal of these substances is imperative to the production of useful diethyl ether, and this removal apparently cannot be accomplished by ordinary fractional distillation. It is therefore necessary to resort to special purification treatments in order to produce economically diethyl ether of sufficient purity to be acceptable for chemical or pharmaceutical purposes.

A primary object of this invention is to provide an effective and economical process by means of which pure diethyl ether can be readily made. Another object is to provide a process for making diethyl ether of great purity from the products of the hydrolysis of ethyl sulfates.

The process broadly comprises treating the diethyl ether to be purified, for example, the ether fraction obtained from the products of the hydrolysis of ethyl sulfates, with an oxidizing agent which may be sulfuric acid or chlorine, with an agent which will remove aldehydes from the ether, such as a solution of a soluble inorganic bisulfite or an alkaline suspension of mercury oxide, and with a strong alkali solution. This treatment may or may not be followed by a final distillation of the purified diethyl ether.

In practicing the invention several procedures may be followed. For example, the diethyl ether fraction as obtained from the products of hydrolysis of ethyl sulfate liquors may be treated with concentrated sulfuric acid to polymerize or destroy hydrocarbon impurities and to liberate combined aldehydes. The ether may then be separated from the sulfuric acid and treated with a solution of sodium bisulfite to remove aldehydes and ketones. After separation from the bisulfite solution, it may be washed with a solution of strong alkali, such as sodium hydroxide, to dehydrate the ether and to remove acidic materials, and the ether after this treatment may be distilled through an efficient fractionating column to effect a final purification. The treatment outlined above makes possible the production of very pure diethyl ether which meets readily the specifications set up in the United States Pharmacopoeia, tenth revision.

The process may be modified by washing the ether after the acid treatment with a strong caustic solution containing suspended mercury oxide, for example a solution obtained by dissolving a mercuric salt in strong sodium hydroxide solution. This treatment with alkaline mercury oxide removes aldehydes and ketones and dehydrates the ether. At the same time acidic materials are removed. The ether after separation from the alkaline mercury oxide solution may be distilled as before to finally purify it. This variation of the process produces diethyl ether of very great purity, but because of the mercury salts required may be somewhat expensive.

The mercury oxide treatment may be used in conjunction with the bisulfite process by adding a little mercury salt to the alkali wash used in the bisulfite process. By this means, ether of exceptionally great purity is obtained.

A third method of treatment may be carried out where the use of sulfuric acid is undesirable or unnecessary, as, for example, where very pure ether is not desired or when hydrocarbon impurities or combined aldehydes are not present. In this method the crude diethyl ether is first treated with bisulfite solution and separated therefrom. Chlorine is passed into the ether until actual chemical tests or the yellow coloration indicate the presence of free chlorine. The ether containing the chlorine is then washed with strong alkali solution and finally distilled as previously described.

In carrying out the new process it is not necessary in all cases to employ the final step of distilling the treated ether. This step may be omitted in the preparation of diethyl ether of sufficient purity for most technical purposes.

The invention will be illustrated by the following examples, and a system for carrying out a preferred embodiment of the invention is diagrammatically shown in the accompanying drawing.

*Example 1*

Referring to the drawing, crude diethyl ether was admitted by a line 10 into a tank 12 made of acid resistant material. Concentrated (95%) sulfuric acid was admitted into the tank 12 by a line 11, the ratio of ether to acid being 5 to 1 by volume. To provide agitation, the ether and acid mixture was withdrawn from the tank 12 by a line 13 and circulated by means of a pump 14, a line 15 and a line 16 back into the tank 12. A temperature of about 50° to about 85° C. is desirable to assist in removal of impurities. The system is therefore operated under pressure to avoid loss of ether at such elevated temperatures. By addition of about 4 volumes of water to the mixture in the tank 12, the ether was caused to separate as a top layer. The ether was then separated from the diluted acid. This may be done by decantation, but is preferably accomplished by distillation. In this case the mixture of dilute acid and ether was drawn from the tank 12 by the line 13 and transferred by the pump 14, the line 15 and a line 18 into a still kettle 19 provided with a steam coil 20. Line 17 may be used to remove the lower or acid layer when the ether and acid are to be separated by gravity.

In the still kettle 19 the ether was distilled out of the mixture through a line 21 and was condensed in a condenser 22 from which it passed by a line 23 into a tank 24. In the tank 24 the ether was mixed with 1 volume of a 20% solution of sodium bisulfite which was admitted by a line 25. The ether was thoroughly agitated with the bisulfite solution by circulating the mixture by means of a line 26, a pump 27, a line 28, and a line 29 back into the tank 24. After this agitation the ether was separated from the bisulfite solution by drawing off the latter from the tank 24 by line 26, pump 27, line 28 and discharging it through a line 30. The ether was then transferred by a line 31 to a tank 32.

In the tank 32, between ½ and 1 volume of 35% sodium hydroxide solution was added to the ether by means of a line 33. The ether was agitated with this solution to effect washing by circulating the mixture by means of a line 34, a pump 35, a line 36, and a line 37 back to the tank 32. The ether and caustic solutions were separated by drawing off the caustic layer by means of line 34, pump 35, line 36 and a line 38. The ether was then transferred by a line 39 into a still kettle 40.

Vapors from the still kettle 40 passed by a line 41 into a rectifying column 42 where final purification was effected. The column 42 was connected by a vapor line 43 to a condenser 44 and provided with reflux by a line 46 from a weir 45. Liquid from the column 42 was returned to the kettle 40 by a line 48, and the finally purified ether was removed by a line 47.

The ethyl ether obtained by this treatment was of very high purity and readily met the requirements for diethyl ether of the United States Pharmacopoeia, tenth revision.

*Example 2*

In the process of this example, the removal of aldehydes and ketones was accomplished by washing the diethyl ether with a strongly alkaline solution or suspension of mercury oxide.

The diethyl ether was treated with concentrated sulfuric acid as in Example 1, in the ratio of 5 volumes of ether to 1 volume of acid. After the ether was separated from the sulfuric acid it was agitated with ½ volume of 35% sodium hydroxide solution to which had been added 1% of a mercuric salt dissolved in a little water.

After treatment with the caustic and mercury oxide, the ether was separated and distilled as in Example 1. The resultant diethyl ether was exceptionally pure.

In the process as described, many variations may be made. For example, soluble inorganic bisulfites other than sodium bisulfite may be used, and equivalents of sodium hydroxide, such as potassium hydroxide, are suitable. Alkaline solutions of almost any strength may be used. It is more convenient to use strong alkali solutions, containing at least 35% of sodium hydroxide, since these stronger solutions aid materially in dehydrating the ether.

We claim:

1. Process which comprises treating impure diethyl ether with an oxidizing agent of the group consisting of sulfuric acid and chlorine; with an aldehyde-removing agent of the group consisting of soluble inorganic bisulfites and mercury oxide; and subsequently treating the ether with a solution of a strong alkali.

2. Process which comprises hydrolizing ethyl sulfates and separating a diethyl ether fraction from the products thereof; treating said diethyl ether fraction with an oxidizing agent of the group consisting of sulfuric acid and chlorine; with an aldehyde-removing agent of the group consisting of soluble inorganic bisulfites and mercury oxide; and subsequently treating the ether with a solution of a strong alkali.

3. Process which comprises hydrolizing ethyl sulfates and separating a diethyl ether fraction from the products thereof; treating said diethyl ether fraction with an oxidizing agent of the group consisting of concentrated sulfuric acid and chlorine gas; with an aldehyde-removing agent of the group consisting of a water-soluble inorganic bisulfite and mercury oxide; and subsequently treating the ether with a solution of a strong alkali of a concentration greater than about 35%.

4. Process which comprises hydrolizing ethyl sulfates and separating a diethyl ether fraction from the products thereof; treating said diethyl ether fraction with an oxidizing agent of the group consisting of concentrated sulfuric acid and chlorine gas; with an aldehyde removing agent of the group consisting of sodium bisulfite and mercury oxide; and subsequently treating the ether with a solution of a strong alkali of a concentration greater than about 35%, and thereafter distilling the treated diethyl ether.

5. Process which comprises hydrolizing ethyl sulfates and separating a diethyl ether fraction from the products thereof; treating said diethyl ether fraction separately and successively with sulfuric acid; with a solution of soluble inorganic bisulfite; and with a caustic alkali solution to dehydrate the ether.

6. Process which comprises treating impure diethyl ether separately and successively with concentrated sulfuric acid; with a solution of sodium bisulfite; and with a solution of sodium hydroxide.

7. Process which comprises treating impure diethyl ether separately and successively with about one-fifth its volume of concentrated sulfuric acid; with about an equal volume of about 20% sodium bisulfite; and with from about one-half to about equal its volume of sodium hydroxide solution of at least about 35% concentration, and thereafter fractionally distilling the resultant alkali-treated diethyl ether.

8. Process which comprises hydrolizing ethyl sulfates and separating a diethyl ether fraction from the products thereof; treating said diethyl ether fraction separately and successively with sulfuric acid and with a solution of strong alkali containing mercury oxide.

9. Process which comprises purifying diethyl ether by treating the ether separately and successively with concentrated sulfuric acid and with a solution of sodium hydroxide containing mercury oxide.

10. Process which comprises hydrolizing ethyl sulfates and separating a diethyl ether fraction from the products thereof; treating said diethyl ether separately and successively with a solution of soluble inorganic bisulfite; with chlorine; and with an alkali solution.

11. Process which comprises purifying diethyl ether by treating the ether separately and successively with a solution of sodium bisulfite; with sufficient chlorine to produce free chlorine in the ether; and with sodium hydroxide solution.

12. Process which comprises purifying diethyl ether by treating the ether separately and successively with about an equal volume of 20% sodium bisulfite solution; with sufficient chlorine gas to produce free chlorine in the ether; with from about one-half to about an equal volume of sodium hydroxide solution of at least about 35% concentration.

13. Process which comprises treating impure diethyl ether with concentrated sulfuric acid; distilling the ether from the resultant reaction mixture; and treating the distilled ether successively with a solution of soluble, inorganic bisulfite and with an alkaline solution.

14. Process which comprises hydrolizing ethyl sulfates and separating a diethyl ether fraction from the reaction products; reacting the said diethyl ether fraction with concentrated sulfuric acid; distilling the ether from the resultant mixture; and treating the distilled ether successively with a solution of a soluble, inorganic bisulfite; and with a solution of a caustic alkali.

15. Process which comprises treating impure diethyl ether with about one-fifth its volume of concentrated sulfuric acid; distilling the ether from the resultant reaction mixture; and treating the distilled ether separately and successively with about an equal volume of about 20% sodium bisulfite, and with from about one-half to one times its volume of a caustic alkali solution of at least around 35% concentration.

16. A process which comprises treating impure diethyl ether with concentrated sulphuric acid at an elevated temperature within the range from about 50° C. to about 85° C., thereby polymerizing hydrocarbon impurities present therein and converting combined aldehydes to simple aldehydes, washing the partially purified ether with a water-soluble bisulfite, thereby removing from the ether simple aldehydes and ketones, treating the washed ether with a strong solution of caustic alkali of dehydrating strength, thereby dehydrating the ether and removing therefrom acidic substances, distilling the alkali-treated ether, and recovering the distilled ether.

17. A process which comprises treating impure diethyl ether with concentrated sulphuric acid under superatmospheric pressure at an elevated temperature, thereby polymerizing hydrocarbon impurities present therein and converting combined aldehydes to simple aldehydes, washing the partially purified either with a water-soluble bisulfite, thereby removing from the ether simple aldehydes and ketones, treating the washed ether with a strong solution of caustic alkali of dehydrating strength, thereby dehydrating the ether and removing therefrom acidic substances, distilling the alkali-treated ether, and recovering the distilled ether.

18. A process which comprises treating impure diethyl ether with about ⅕ its volume of concentrated sulphuric acid, thereby polymerizing hydrocarbon impurities present therein and converting combined aldehydes to simple aldehydes, washing the partially purified ether with a water-soluble bisulfite, thereby removing from the ether simple aldehydes and ketones, treating the washed ether with a strong solution of caustic alkali of dehydrating strength, thereby dehydrating the ether and removing therefrom acidic substances, distilling the alkali-treated ether, and recovering the distilled ether.

19. A process which comprises treating impure diethyl ether with sulphuric acid under superatmospheric pressure, thereby polymerizing hydrocarbon impurities present therein and converting combined aldehydes to simple aldehydes, distilling the acid-treated ether, washing the distilled ether with a water-soluble bisulfite, thereby removing simple aldehydes and ketones, treating the washed ether with a strong solution of caustic alkali, thereby dehydrating the ether in the substantial absence of aldehydes, distilling the alkali-treated ether, and recovering the distilled ether.

20. The method of purifying ether that comprises contacting it with mercuric oxide.

21. The method of purifying ether that comprises contacting it with an aqueous suspension of freshly prepared mercuric oxide.

22. The method of removing aldehydes from ether that comprises contacting the ether with a bisulfite solution.

23. The method of removing aldehydes from ether that comprises contacting the ether successively with a bisulfite solution and an alkali.

24. The method of removing aldehydes from ether that comprises contacting the ether successively with an aqueous sodium bisulfite solution and an aqueous sodium hydroxide solution.

HENRY L. COX.
PAUL S. GREER.